UNITED STATES PATENT OFFICE.

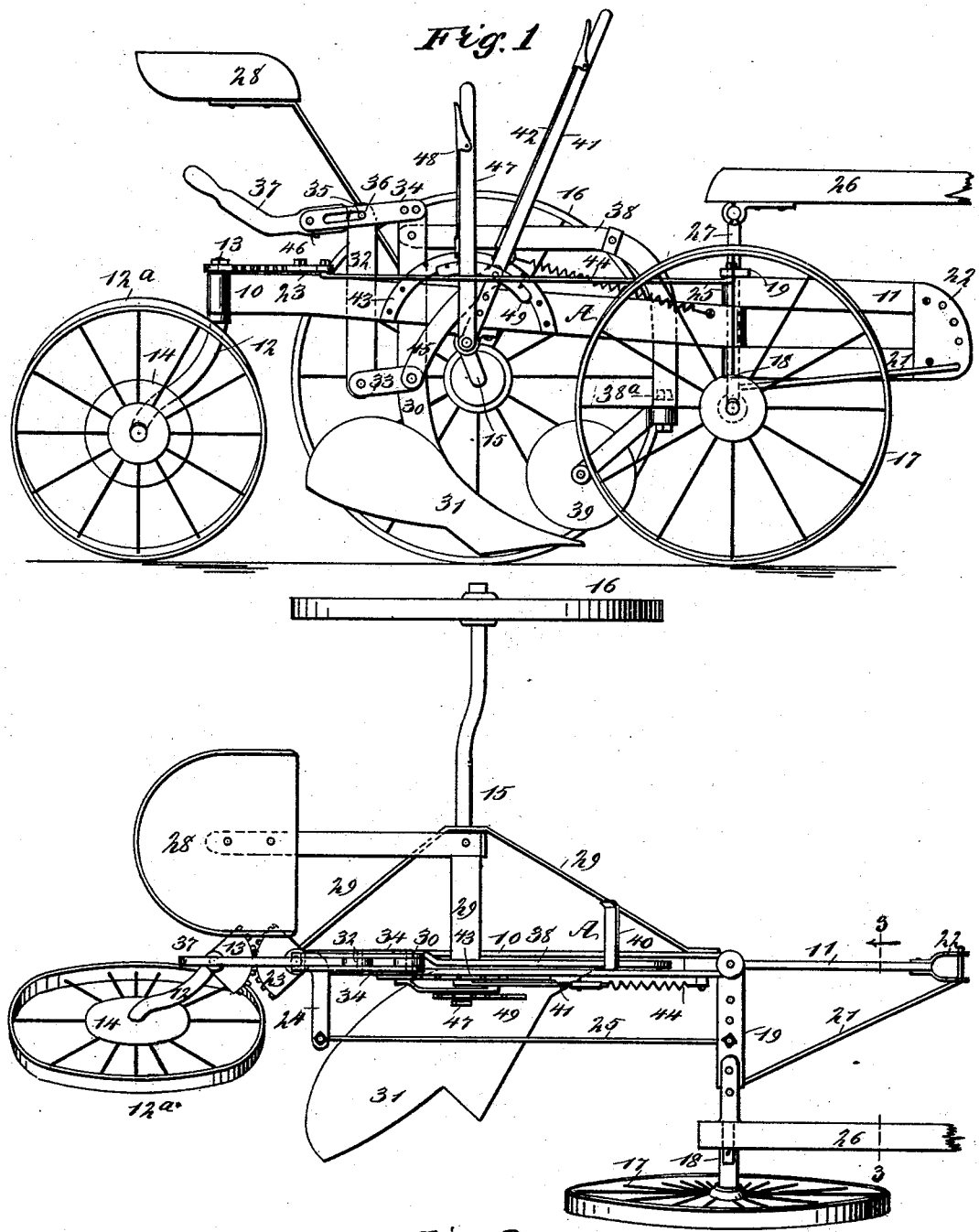

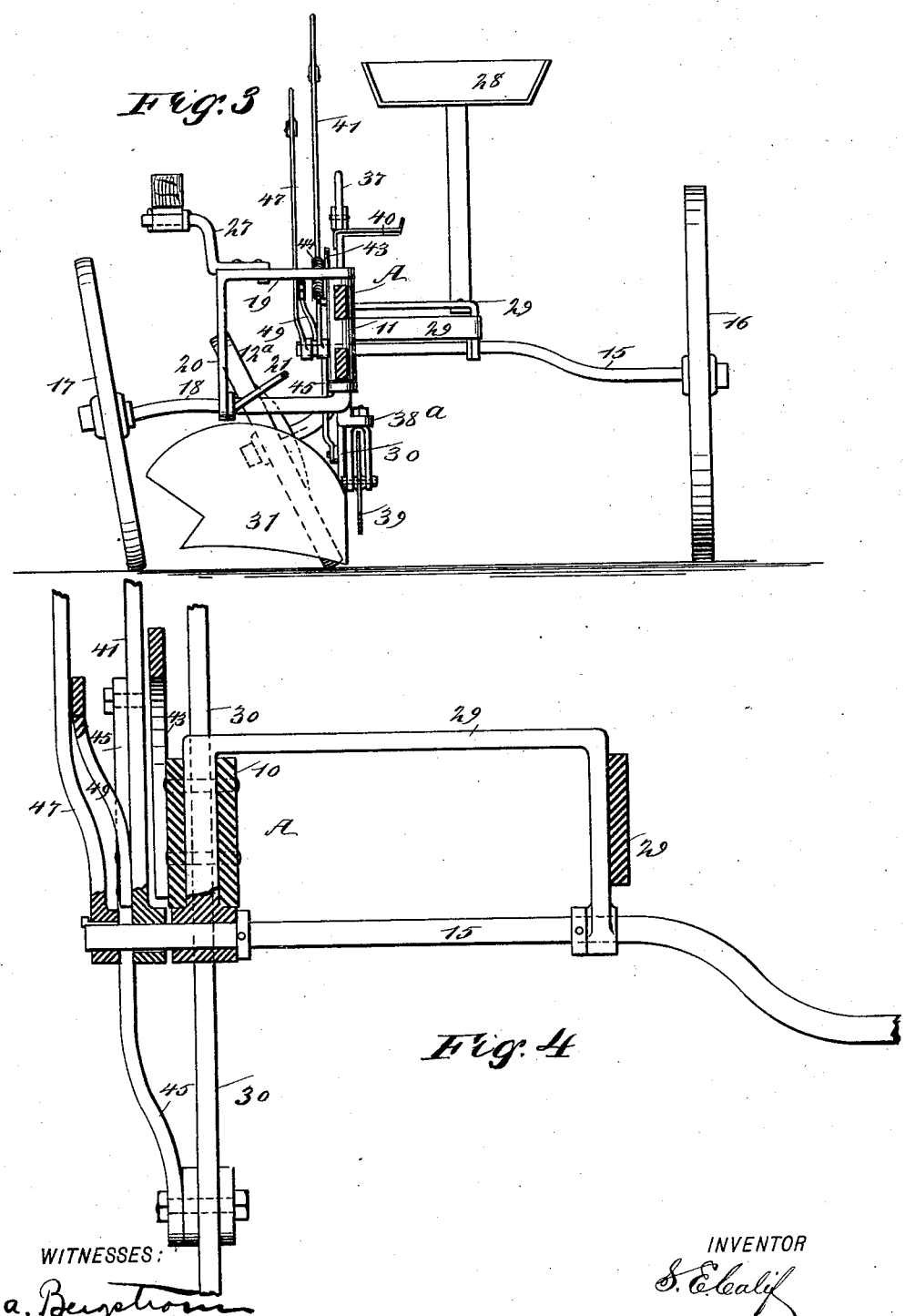

STEPHEN E. CALIF, OF WILSON, MISSOURI.

SULKY-PLOW.

SPECIFICATION forming part of Letters Patent No. 508,811, dated November 14, 1893.

Application filed August 14, 1893. Serial No. 483,085. (No model.)

*To all whom it may concern:*

Be it known that I, STEPHEN E. CALIF, of Wilson, in the county of Adair and State of Missouri, have invented a new and useful Improvement in Sulky-Plows, of which the following is a full, clear, and exact description.

The invention is an improvement in that class of sulky plows which are provided with wheels mounted on crank axles adapted to swing in a horizontal plane, the said axles being connected by rods so that they swing in unison for the purpose of facilitating the turning of angles.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a side elevation of the improved sulky plow. Fig. 2 is a plan view thereof. Fig. 3 is a vertical section taken practically on the line 3—3 of Fig. 2, illustrating the major portion of the plow in front elevation; and Fig. 4 is a section taken practically through the mechanism for lifting and leveling the plow, said mechanism being located upon the rear axle, which is shown in elevation.

In carrying out the invention the beam A of the plow comprises a fixed section 10, which is provided with a longitudinal slot extending through it nearly from end to end, and a forward swinging section or draft connection 11 having a pivot connection with the forward end of the fixed section of the beam. At the rear end of the fixed section of the beam an axle 12, is pivoted, the upper end of which axle is provided with an attached mutilated gear 13, and the axle is of angular form, being practically L-shaped, and is so curved that the rear wheel 13 of the plow, which is held to turn upon the axle, is given a decided vertical inclination in direction of the land side, or in direction of the left-hand side of the beam. In fact, the inclination of the rear wheel is such that the lower portion of the wheel will travel in the furrow, while the upper portion will incline decidedly to the right. This wheel is provided with a cap 14 upon its land side, located at the hub, said cap serving to prevent weeds from becoming entangled in the spokes of the wheel. A second axle of crank form and designated as 15, is pivoted in a suitable bearing attached to the fixed section of the beam at or near the center. The crank axle 15, extends at a right angle from the right-hand side of the beam, and has journaled upon its outer end a supporting wheel 16, the wheel being much larger than the rear wheel, and it is adapted to travel upon the land.

A third supporting wheel 17, preferably of larger diameter than the rear wheel, but not as large as the wheel 16, is located upon the right-hand side of the plow, it being journaled upon the outer end of the crank axle 18, which axle is attached to the rear portion of the swinging section 11 of the beam, and this axle is so curved that its wheel inclines from the top downward in direction of the left-hand side of the plow, it being adapted also to travel in the furrow, but to the right of the rear wheel.

It is designed that the plow share may be allowed to remain in the ground, and yet the plow be turned to the right or to the left; this result is due to the sectional construction of the beam to a great extent, and furthermore to a connection between the front axle and the rear one, whereby the two will move simultaneously in the same direction. To that end a bracket 19, is projected from the upper pivot point of the swinging section of the beam at right angles from the right hand side thereof, the bracket being supported by a suitable upright 20, connected with the axle, as shown in Fig. 3, and the axle and forward end of the swinging section 11 of the axle are connected by a brace rod 21, since the clevis 22, is located at the said forward end of the swinging section of the beam. A mutilated gear 23, is journaled upon the rear upper portion of the fixed section of the beam, and engages with the corresponding gear 13 connected with the axle of the rear wheel. The forward mutilated gear 23, is turned through the medium of a lever 24, attached to it and extending outward in direction of the right-hand side of the machine, and the said lever is adjustably connected with the bracket 19 on the forward or swinging section of the beam through the medium of a rod 25, or its equivalent. Thus it will be observed that whichever way the forward section of the beam may be turned to guide the plow, the rear wheel is compelled to follow and move simultaneously. A pole 26, is attached to an extension 27 from the right-hand end of the bracket 19 of the swinging section, and the said pole is adapted as a guide for the team. The driver's seat 28, is located upon the platform 29, which is projected from the left-hand side of the beam, and extends over the left-hand axle 15.

A plow standard 30, is held to slide vertically in the slot of the fixed section of the beam, the plow 31, being secured to the standard in any approved manner. Immediately back of the plow standard a post 32, is secured in the fixed section of the beam, extending above and below the same, and the lower end of the post is connected with the plow standard through the medium of preferably parallel links 33, while another set of parallel links 34, serve to pivotally connect the upper end of the plow standard with the upper end of the post. The upper links 34, extend beyond the rear edge of the post, and the said links are provided near their rear ends with longitudinal slots 35, in which a pin 36, is located, extending through the upper end of the post; and at the rear end of the upper links 34, a lock lever 37, is pivoted, adapted for locking engagement with the rear face of the post.

An arm 38, is secured to the upper portion of the plow standard, constituting a branch therefrom, and the said arm is carried forwardly over the fixed section of the beam and then downwardly through the slot therein, and is made to terminate at its lower end in a slotted foot 38ª, extending horizontally beyond the left-hand side of the beam. The slotted foot is adapted to adjustably receive a colter 39, and the colter 39 is removable from the extension of the plow-standard in order that a colter of suitable diameter for use in connection with any plow may be placed upon the arm or extension 38. The said arm or extension 38, is provided at its upper forward portion with a foot rest 40, upon which the driver may rest a foot and by exerting pressure thereon force the arm or extension of the plow standard, and likewise the plow standard itself, downward to cause the plow point to enter the ground for a greater or less distance.

The plow and colter are raised and lowered primarily through the medium of a hand lever 41, located within convenient reach of the driver and upon the right-hand side of the beam, said lever being fulcrumed upon the right-hand end of the left-hand axle 15. The lever 41, is provided with the usual thumb latch 42, adapted for engagement with a rack 43, the latter being secured to the right-hand side of the plow beam. A spring 44, is attached to the lever 41 and to the forward portion of the fixed section of the beam, while a connecting rod 45, serves to pivotally unite the lever 41, with the plow shank at the pivotal connection of said shank with the lower links 33. The lever 41, is adapted for use in raising and lowering the plow share. When the lever is carried to the rear, the plow shank, and consequently the colter arm or extension of the shank and the plow, is lowered, and the spring 44, is placed under tension, the work of lowering the plow share being assisted by exerting pressure with the foot upon the foot rest 40. The lever may then be locked in its rear position. When the plow is to be raised, the spring 44 assists in carrying it upward, and therefore the operator need not exert forward pressure to any great extent upon the lever, and when the plow share is raised it will be locked in that position, no matter whether the lock latch operates or not, by the rear lock lever 37. The lock lever 37 may also be used to assist in carrying the plow beam upward, as the lever is close to the driver's seat; and while it may be raised, it can not be lowered at its handle end farther than shown in Fig. 1, owing to a stop 46, located thereon and adapted for engagement with the under side of the link 34. The plow may be leveled up without interfering in the slightest degree with the adjusting apparatus, by the manipulation of a lever 47, which is secured to the right-hand end of the left-hand crank axle 15, the lever being provided with a thumb latch 48, which engages with a rack 49, usually located upon the lift lever 41.

Having thus described my invention, I claim as new and desire to secure by Letters Patent—

1. In a sulky plow, the combination, with the frame, axle and plow-share, of the lever 41 and link 45, the rear, supplementary lifting lever 37, pivoted to the shank of the plow share on a fixed post 32, and the links 33, which connect the lower end of said post with the plow-share, as shown and described.

2. In a sulky plow, the combination, with a beam consisting of a fixed rear section and a forward swinging section, of an adjustable axle carried by the fixed beam section at one side, a second axle journaled at the rear of the fixed beam section, and a third axle secured to the rear portion of the swinging section of the beam, supporting wheels carried by all of the axles, the forward and rear supporting wheels being on one side of the machine and the intermediate supporting wheel upon the opposite side, a coupling connection between the front and rear axles, whereby they move simultaneously, a plow shank having sliding movement in the fixed section of the beam, an adjusting lever connected with the plow shank, whereby it is raised and lowered, and a second adjusting lever connected with the crank axle, as and for the purpose specified.

3. In a sulky plow, the combination, with a beam consisting of a fixed rear section and a forward swinging section, of an adjustable axle carried by the fixed beam section at one side, a second axle journaled at the rear of the fixed beam section, and a third axle secured to the rear portion of the swinging section of the beam, supporting wheels carried by all of the axles, the forward and rear supporting wheels being on one side of the machine and the intermediate supporting wheel upon the opposite side, a coupling connection between the front and rear axles whereby they move simultaneously, a plow shank having sliding movement in the fixed section of the beam, an adjusting lever provided with a spring and connected with the plow shank and fulcrumed upon the crank axle, a fixed rack with which a latch of the lift lever engages, a second adjusting lever provided with a lock latch secured to the crank axle, and a rack carried by the spring-controlled lever and adapted for engagement with the locking device of the axle lever, as and for the purpose set forth.

STEPHEN E. CALIF.

Witnesses:
S. R. PARSONS,
O. SANDS.